US008364750B2

(12) United States Patent
Bolognese et al.

(10) Patent No.: US 8,364,750 B2
(45) Date of Patent: Jan. 29, 2013

(54) AUTOMATED TRANSLATION OF SERVICE INVOCATIONS FOR BATCH PROCESSING

(75) Inventors: Luca Bolognese, Redmond, WA (US); Lucas James Hoban, Seattle, WA (US); Erik Meijer, Mercer Island, WA (US); Anders Hejlsberg, Seattle, WA (US); Matthew J. Warren, Redmond, WA (US); Dinesh Chandrakant Kulkarni, Sammamish, WA (US); Mads Torgersen, Seattle, WA (US); John W. Dyer, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1109 days.

(21) Appl. No.: 12/144,634

(22) Filed: Jun. 24, 2008

(65) Prior Publication Data

US 2009/0319497 A1    Dec. 24, 2009

(51) Int. Cl.
*G06F 15/16* (2006.01)
(52) U.S. Cl. .................. 709/203; 707/999.101; 717/136
(58) Field of Classification Search .................. 709/203; 707/999.101; 717/136
See application file for complete search history.

(56) References Cited

U.S. PATENT DOCUMENTS

| 6,493,719 | B1 * | 12/2002 | Booth et al. ........................... 1/1 |
| 6,560,607 | B1 | 5/2003 | Lassesen |
| 6,882,993 | B1 | 4/2005 | Lawande et al. |
| 6,898,604 | B1 | 5/2005 | Ballinger et al. |
| 7,107,282 | B1 | 9/2006 | Yalamanchi |
| 7,164,676 | B1 | 1/2007 | Chakraborty |
| 7,246,114 | B2 | 7/2007 | Bolognese et al. |
| 2001/0054172 | A1 | 12/2001 | Tuatini |
| 2003/0149689 | A1 * | 8/2003 | Chow et al. ........................ 707/3 |
| 2004/0030679 | A1 | 2/2004 | Gonnet |
| 2004/0073828 | A1 | 4/2004 | Bronstein |
| 2004/0193575 | A1 | 9/2004 | Chen et al. |
| 2004/0194057 | A1 | 9/2004 | Schulte et al. |
| 2004/0194068 | A1 | 9/2004 | Warren et al. |
| 2004/0267760 | A1 | 12/2004 | Brundage et al. |
| 2005/0097146 | A1 | 5/2005 | Konstantinou et al. |
| 2005/0183071 | A1 | 8/2005 | Meijer et al. |
| 2005/0262124 | A1 | 11/2005 | Christensen et al. |

(Continued)

FOREIGN PATENT DOCUMENTS

| EP | 0378367 A2 | 7/1990 |
| WO | 2007061430 A1 | 5/2007 |

OTHER PUBLICATIONS

Box et al. "The LINQ Project .NET Language Integrated Query", Date: May 2006, 31 Pages.

(Continued)

*Primary Examiner* — Thomas Dailey
(74) *Attorney, Agent, or Firm* — Microsoft Corporation (57) ABSTRACT

The utilization of data services (such as web services) may involve the invocation of services, which may reduce performance and overburden the server. In some scenarios, the invocation may be specified in a language that does not support batch invocation, but it may not be feasible to re-code the invocations in a language that supports batching. Instead, the service invocations may be automatically translated into a batch logic specified in a batch-capable language and sent to the service as a batch. For example, a local proxy may receive a language-integrated query having two or more service invocations, compile the query into an expression tree including the two or more invocations, and send the expression tree to the service host to achieve the batch processing of the service invocations.

14 Claims, 5 Drawing Sheets

U.S. PATENT DOCUMENTS

| | | | |
|---|---|---|---|
| 2006/0053159 A1* | 3/2006 | Aridor et al. | 707/103 R |
| 2006/0212418 A1 | 9/2006 | Dettinger et al. | |
| 2006/0230017 A1* | 10/2006 | Larson et al. | 707/2 |
| 2006/0253430 A1 | 11/2006 | Fernandes et al. | |
| 2006/0288047 A1 | 12/2006 | Chron et al. | |
| 2007/0006128 A1 | 1/2007 | Chowdhary et al. | |
| 2007/0006145 A1 | 1/2007 | Hill et al. | |
| 2007/0027849 A1 | 2/2007 | Meijer et al. | |
| 2007/0027905 A1 | 2/2007 | Warren et al. | |
| 2007/0028222 A1* | 2/2007 | Meijer et al. | 717/140 |
| 2007/0050348 A1 | 3/2007 | Aharoni et al. | |
| 2007/0083807 A1 | 4/2007 | Shaudys et al. | |
| 2007/0174763 A1 | 7/2007 | Chang et al. | |
| 2007/0219973 A1 | 9/2007 | Cui et al. | |
| 2007/0226196 A1 | 9/2007 | Adya et al. | |
| 2007/0226203 A1 | 9/2007 | Adya et al. | |
| 2007/0271233 A1 | 11/2007 | Hejlsberg et al. | |
| 2009/0024571 A1* | 1/2009 | Thiyagarajan et al. | 707/2 |
| 2009/0319496 A1 | 12/2009 | Warren et al. | |
| 2009/0319498 A1 | 12/2009 | Zabokritski et al. | |
| 2009/0319499 A1 | 12/2009 | Meijer et al. | |
| 2009/0327220 A1 | 12/2009 | Meijer et al. | |

OTHER PUBLICATIONS

Champion Michael "NET Language-Integrated Query for XML Data", Date: Feb. 2007, pp. 1-27, http://msdn2.microsoft.com/en-us/library/bb308960.aspx.

"Expression Trees in LINQ", Copyright 2007, 1 Page http://msdn2.microsoft.com/en-us/library/bb882636.aspx.

Hall Tim, "Bulk Collection of DML Results", Date: 2006, 5 Pages, http://www.dba-oracle.com/plsql/t_plsql_dml.htm.

Hall Tim, "Bulk Update Operations", Date: 2006, 4 Pages, http://www.dba-oracle.com/plsq/t_plsql_bulk_update.htm.

Hejlsberg et al. "The. NET Standard Query Operators", Copyright: 2006, pp. 1-30 http://download.microsoft.com/download/5/8/6/5868081c-68aa-40de-9a45-a3803d8134b8/standard_query_operators.doc.

Meijer Erik, "LINQ 2.0: Democratizing the Cloud", pp. 1-4 http://2007.xtech.org/public/asset/attachment/184.

Meijer, et al. "Visual Studio Developer Center", Date: Feb. 2007, pp. 1-7, http://msdn2.microsoft.com/en-us/library/ms364068(VS.80).aspx.

"Oracle PL/SQL Programming Guide to Oracle 8i Features", 6 pages, http://www/unix.org.ua/orelly/oracle/guide8i/ch05_02.htm.

"Source and Target Operators", 34 Pages http://download.oracle.com/docs/cd/B31080_01/doc/owb.102/b28223/ref_src_tgt_opers.htm#i1175826.

"XQuery Operators", Copyright: 2005-2007, 6 Pages http://www.xquery.com/tutorials/guided-tour/xquery-operators.html.

U.S. Appl. No. 12/144,630, filed Jun. 24, 2008, Warren et al.
U.S. Appl. No. 12/144,639, filed Jun. 24, 2008, Zabokritski et al.
U.S. Appl. No. 12/144,670, filed Jun. 24, 2008, Torgersen et al.
U.S. Appl. No. 12/145,523, filed Jun. 25, 2008, Meijer et al.

Kostoulas, et al., "XML Screamer: An Integrated Approach to High Performance XML Parsing, Validation and Deserialization", Proceedings of the 15th international conference on World Wide Web, Date: May 23-26, 2006, pp. 93-102, Publisher: ACM New York, NY, USA.

Meijer, et al., "XLinq: XML Programming Refactored (The Return of the Monoids)", 18 Pages, http://research.microsoft.com/~emeijer/Papers/XMLRefactored.html, Oct. 12, 2007.

* cited by examiner

AUTOMATED TRANSLATION OF SERVICE INVOCATIONS FOR BATCH PROCESSING

BACKGROUND

Contemporary computer servers now provide a wide variety of data services in order to fulfill requests from other computer systems on behalf of various clients. In one scenario, a server may be configured to provide data items representing information of interest, such as stock prices or weather forecasts. In another scenario, a server may perform various calculations and data manipulation at the request of other computer systems; for example, a high-performance, massively parallel supercomputer may evaluate mathematical models on behalf of client computer systems, such as multivariate linear algebra problems and molecular biology simulations. In a third scenario, a server may manage access to a physical component, such as a robot or a factory machine, and may accept requests for manipulating the physical component provided by users of other computer systems.

These scenarios involve the communication of data items, such as computer-executable instructions, between a server and at least one client computer system. The server is often configured to communicate with such clients by offering one or more services, where each service offers one or more service functions. Clients may then utilize the services by invoking the one or more service functions, which may involve providing parameters for use in the service functions. The server may respond to the invocation by (e.g.) validating the service function parameters, performing the operations involved in fulfilling the invoked service function, and returning one or more result data items produced by the performance of the service function. For example, a client may request a share price from a stock market database, and may provide a stock symbol identifying a publicly traded company. The server may respond by verifying that the provided stock symbol is valid and that the requested share price is available, by retrieving the share price (e.g., from a stock market database), and by notifying the client of the share price.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The network communication and service invocation scenario outlined above may present some delays while processing multiple usages of the services. A client utilizing the services may often issue a first invocation, wait for the first invocation to complete, then issue a second invocation, wait for the second invocation to complete, then issue a third invocation, etc. Each invocation involves the serialization of parameters, network transport for the request to the server, the deserialization of parameters, the establishment of a connection on the server side, the invocation of the service, the serialization of the results, the closing of the connection on the server, and network transport back to the client, and deserialization of the results. Where the client heavily utilizes the services, particularly in a serial manner, the ensuing costs of using the service may take a heavy toll of time and resources for both the server and the client.

Several of these costs may arise because the programming construct of the query may be oriented around a single invocation model, involving one invocation of the service through the server and the return of the results. For example, a database query is often structured as a single request written in a single language (e.g., a language-integrated query), and some such languages may not support the packaging of multiple queries of this programming language. Thus, where the service invocation is specified according to this programming construct, the client may process each invocation as an individual invocation, with all of the associated costs of each invocation.

However, some servers are capable of accepting and processing a service invocation that is specified in any of several programming languages, or even a service invocation having different portions specified in different languages. Some of the alternative programming languages may support multiple invocations, either executed in serial or in parallel, and some may also support other programming features, such as conditional logic and object use. Thus, where a client processes at least two service invocations specified in a first language that does not support multiple invocations, the client may instead translate the service invocations into a second language that supports multiple invocations. The translated set of invocations may be sent together to the server and processed together by the server, and the results of the set of invocations may be returned together to the client. In this manner, the associated costs of the service invocation (serialization and deserialization of the parameters and result set, network transport to and from the server, connection opening and closing, etc.) may be performed once for the set of service invocations, instead of once for each service invocation in the set of invocations, resulting in reduced time and resource usage and improved performance of the invocation processing.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

This disclosure pertains to the utilization of data services provided by a server, the services comprising one or more service functions that may be invoked to achieve a desired result. The server may be configured to receive requests from clients (e.g., software running on the client's machine that operates on data provided by the server) and to perform the invoked service functions on behalf of the clients. The server may also notify the client of the completion of the service invocations, and may send to the client a result data set generated by the invoked service functions.

Figure 1:
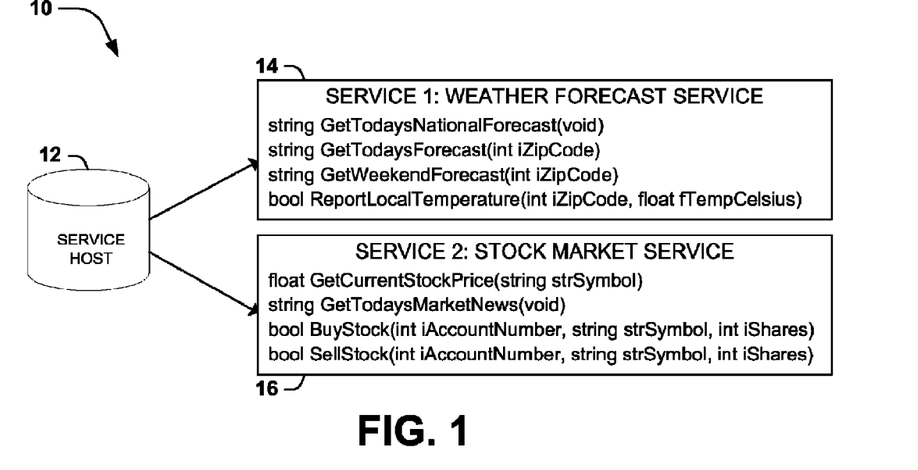
FIG. 1 is an illustration of a set of services having various service functions that may be provided by a server.

FIG. 1 illustrates one example 10 of such services that may be provided by a server. In this example 10, the service host 12 offers two services: a weather forecast service 14, which provides and receives information about weather forecasts, and stock market service 16, which provides information and fulfills requests related to shares of publicly traded companies. The services are provided as a set of service functions, where each service function permits clients to request from the server the performance of a data task, such as retrieving and providing information, accepting information, and/or taking an action. For example, the weather forecast service 14 permits clients to request today's national forecast, which the service host 12 fulfills by providing a string comprising a report of the national weather forecast. The weather forecast service 14 also permits clients to report a local temperature, which the service host 12 may utilize as an informal survey of current temperatures across a nation or the world. Similarly, the stock market service 16 permits clients to request the current share price of stock for a particular company, and also (in this greatly simplified example) to request the service to buy and sell shares of stock from particular companies through a client's stock trading account.

Figure 2:
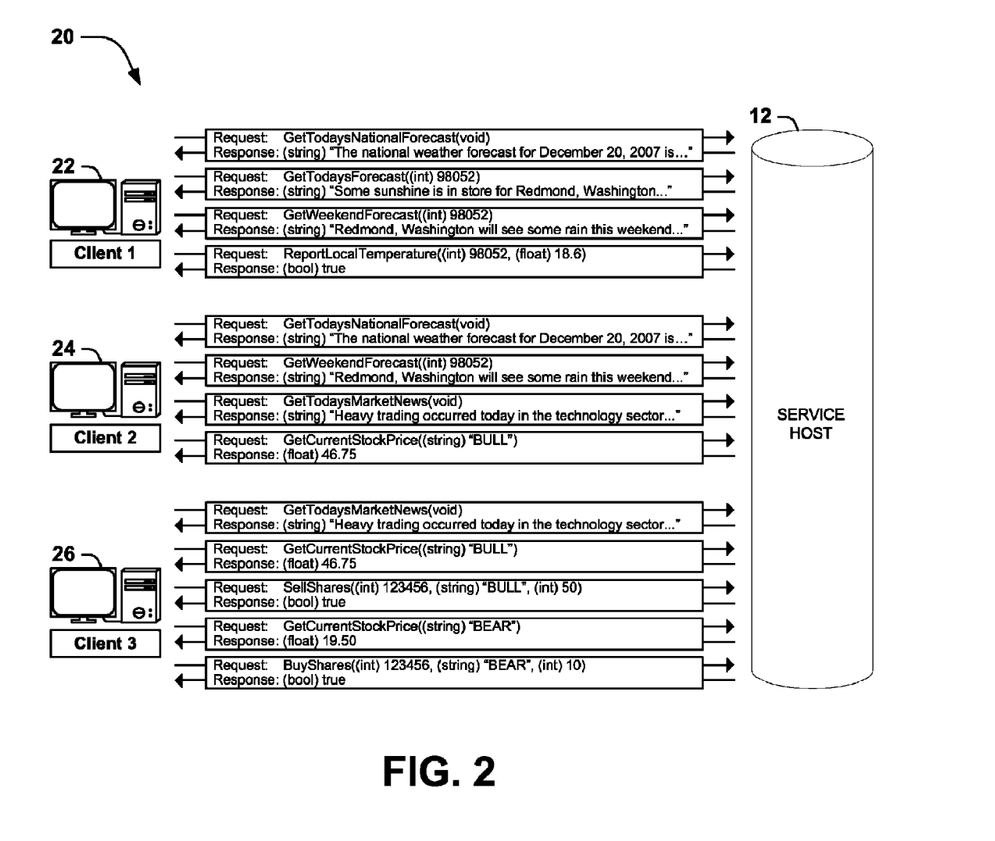
FIG. 2 is an illustration of a set of interactions among a plurality of clients and the server illustrated in FIG. 1.

FIG. 2 illustrates an example 20 of some interactions among the service host 12 of FIG. 1 and a first client 22, a second client 24, and a third client 26. The first client 22 (e.g., on behalf of the user of the computer system comprising the first client 22) requests several types of weather information from the service host 12 by invoking various service functions within the weather forecast service 14. The service host 12 responds through the weather forecast service by providing the output described for each service function (e.g., by providing strings comprising reports for national and local weather.) The first client 22 also provides a local temperature reading, which the weather forecast service 14 collects and stores as part of an informal survey of temperatures across a nation or the world. The second client 24 solicits a wider variety of data, such as the national weather and stock market news of the day, as well as a weekend forecast for a local city and a specific stock price. The service host 12 responds through the weather forecast service and the stock market service by providing the requested information to the second client 24. The third client 26 requests through the stock market service a set of specific information about stock market conditions, and also requests the stock market service to buy and sell a few specific shares of stock through the stock trading account of the third client 26. The service host 12 responds by providing the requested information through the stock market service, and by taking the stock purchase and sale actions requested by the third client 26. In this manner, the service host 12 provides the weather forecast service 14 and the stock market service 16 to various clients through the invocation of service functions.

The example 20 of FIG. 2 illustrates the significant number of service invocations involved in providing various services to various clients. However, omitted from the illustration of FIG. 2 are many of the elements involved in the invocation of the service functions, which may be numerous, time-consuming, and resource-intensive. The elements of the service invocation may affect the performance of the service functions, the computational demands on the service host 12, and the end-user performance observed by the clients of the service.

Figure 3:
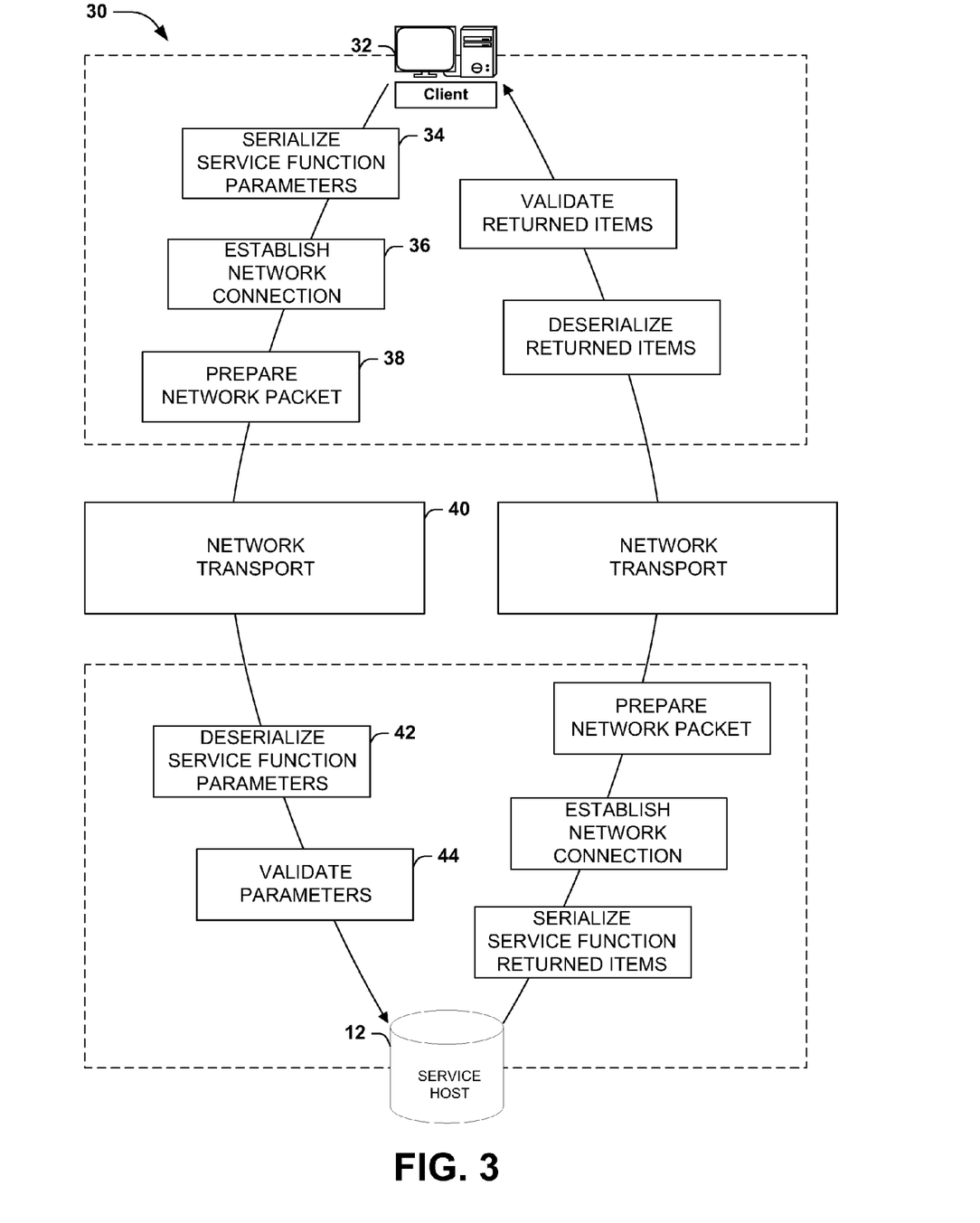
FIG. 3 is an illustration of the elements of an exemplary interaction between a client and a server.

FIG. 3 illustrates some elements in an exemplary interaction 30 between a client 32 and a service host 12 comprising a service invocation. The exemplary interaction 30 may begin at the client 32 with serializing 34 the parameters of the service function to be invoked; e.g., the parameters may be packaged according to a structural protocol, such as the Simple Object Access Protocol (SOAP), and with structural constraints on the parameters, such as big-Endian formatting for multi-byte integers. The exemplary interaction 30 also involves establishing 36 a network connection with the service host 12, such as by looking up the IP address of the service host 12, contacting the service host 12, logging in (possibly with a provision and validation of credentials), and awaiting a connection setup message from the service. The exemplary interaction 30 also involves preparing 38 the network packet, e.g., by preparing network headers for communicating with the service host 12 according to a network communication protocol, such as the Hypertext Transport Protocol (HTTP). Finally, the exemplary interaction 30 involves sending the network packet via network transport 40.

In this exemplary interaction 30, the service host 12 may be configured to receive the network packet and to process the network packet by performing the converse elements in inverse order. For example, the service host 12 may deserialize 42 the service function parameters according to the serialization protocol (e.g., by converting big-Endian-formatted multi-byte integers into a native multi-byte integer storage format.) The service host 12 may also validate 44 the parameters, such as by identifying the invoked service function, checking the bounds of the parameters to be passed into the service function (e.g., validating a stock symbol as a recognized company symbol), and verifying that the client 32 has permission to perform the requested service invocation (e.g., verifying that this client is authorized to purchase and sell stock through the stock trading service.) If these elements are successfully performed and the service invocation is validated, the service host 12 may then perform the invoked service function. If the invocation produces a response and/or one or more data items (e.g., a string comprising a report of a weather forecast), the service host 12 and client 32 may perform a similar set of elements to return the response and/or produced data items to the client 32.

It may be appreciated that the elements of the exemplary interaction 30 of FIG. 3 may involve a significant number of resources and a significant amount of time to complete. As one example, the compression of large parameters, the serialization of many data items, and the digital signature and signature validation of the network packet may involve nontrivial computing resources, such as processing power, system memory, data storage, and network bandwidth. Moreover, the elements of the exemplary interaction 30 cannot be performed instantaneously, and the time involved in performing these elements (in both directions) along with the network transport time produces a significant delay in the processing of the service invocation, in addition to the actual time used by the server in performing the service. Moreover, the client may invoke many service functions, and many such clients may simultaneously operate on this basis (e.g., as illustrated in FIG. 2.) As a result, the performance of the service invocation, and particularly of many service invocations in series, may be undesirably slow, leading to a protracted delay for the clients. The complicated details of the service invocations may also tie up many allocated resources of the server for an extended period of time, and the server may have high operating constraints (e.g., number of processors and storage space) that increase the operating costs of providing the services with acceptable performance criteria.

Some techniques may be utilized for improving the utilization of resources involved in the provision of data services by a server in contrast with the examples illustrated in FIGS. 1-3. In many scenarios, including the scenario illustrated in FIG. 2, the clients seek to invoke several service functions. As one example, the second client 24 is requesting many types of information from many service functions that provide such information. The information requests could be provided together as a batch, and the server may be configured to process the batch of service invocations, e.g., asynchronously and/or in parallel, and to provide the results to the second client 24 as a batch. As another example, the third client 26 may be invoking some service functions as a predicate to invoking other service functions. For example, the invocation of the stock purchase service function may be contingent on the current stock price reported by another service function. Rather than filing two requests with the service host 12, the third client 26 may be able to request the purchase of the stock as contingent upon the stock price. The third client 26 may therefore provide a service usage logic that describes how the third client 26 desires the service functions to be invoked, and the service host 12 may be configured to perform the service usage logic as a single request before returning the data results generated by the service functions invoked by the service usage logic.

However, some programming constructs, such as service invocation features in a particular language, may not permit or facilitate the specification of multiple invocations in a batch. For example, a programming language with a database interface may simply provide an "Execute Query" instruction that executes a single query against the database, and multiple queries are processed by calling the "Execute Query" instruction many times. Therefore, an instruction set written in this language may not be capable of performing a batch of service invocations in a single interaction with the service.

A service may, however, be capable of processing service invocations specified in several languages, and may even be capable of processing a service invocation with a first portion specified in a first language and a second portion specified in a second language. Moreover, some of these languages may include programming constructs for batch invocation. While a developer may choose to target such a batch-capable language (and may redesign the application accordingly), redesign may not be feasible in many scenarios (e.g., where the source code is unavailable, or where the redesign might be prohibitively extensive.)

One solution to this problem involves permitting the developer to write the service invocations in any language, but to translate the invocations on the back end to use such a batch-capable language. As one example, an application may include source code featuring service invocations written in a non-batch-capable language. In conventional scenarios (e.g., as shown in FIG. 2), these invocations might have been sent directly to the server in such a form, and therefore processed individually in a serial manner. However, an alternative execution of the application may involve an automated translation of the service invocations into another language that supports batch invocation, and a delivery of the batch of service invocations to the server. This might be achieved during compilation; e.g., a static invocation specified in the source code might be wholly or partially compiled by a compiler into a translated form of a batch-capable language, and delivered to the server for processing. Another technique for achieving this improvement involves a runtime intermediary, e.g., a local proxy or API that receives the set of service invocations and translates them into the batch-capable language before sending the batch to the service. By translating the invocations from a non-batch formulation to a batch formulation in a batch-compatible language, these techniques may promote the processing of the invocations in a batch manner that reduces the per-invocation costs (in particular, the network transport costs) of non-batch formulations without a manual translation of the invocations by the developers in the batch-capable language.

Additional improvements may also be achieved through the translation. As a first example, the batch-capable language may have serialization and deserialization capabilities that may be harnessed to handle the delivery of parameters sent to the service as part of the invocation (e.g., a data set on which the service operates) and/or the return of a result set generated by the service invocations and delivered from the service to the client. As a second example, the translated set of invocations may embody a programming logic that may embody more programming constructs than a series of invocations. For example, the logic might include program flow constructs that alter the order of service invocations, such as conditional execution and iteration. The logic might also specify different sequences for executing the invocations, rather than a simple series or arbitrary execution of invocations; for example, the logic might specify that a first set of service invocations may be executed in parallel, while a second set of service invocations are to be executed in a sequence, and a third set of service invocations may be executed in any arbitrary order. These and other features may be achieved through the translation of the service invocations into a logic in a batch-compatible language.

Figure 4:
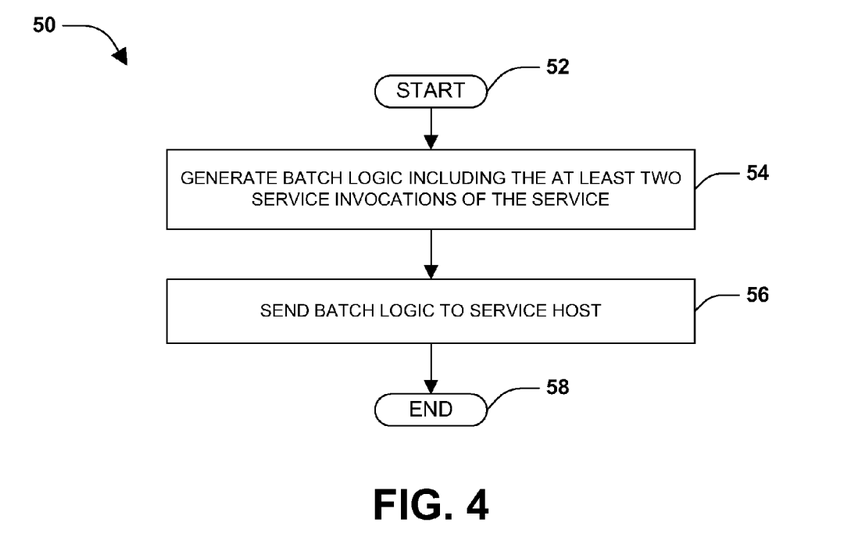
FIG. 4 is a flow diagram illustrating an exemplary computer-implemented method of for invoking at least one service of a service host with at least two service invocations in a first logic specified in a language.

FIG. 4 illustrates a first embodiment of these techniques, comprising an exemplary computer-implemented method 50 of invoking at least one service of a service host with at least two service invocations in a first logic specified in a language. The exemplary computer-implemented method 50 begins at 52 and involves generating 54 a batch logic including the at least two service invocations of the service. The exemplary computer-implemented method 50 also involves sending 56 the batch logic to the service host. Having achieved the delivery of the service invocations to the server in a translated logic having a batching aspect, the exemplary method 50 thereby achieves the batched execution of the service invocations despite the originally non-batching nature specified in the first logic, and so ends at 58.

Figure 5:
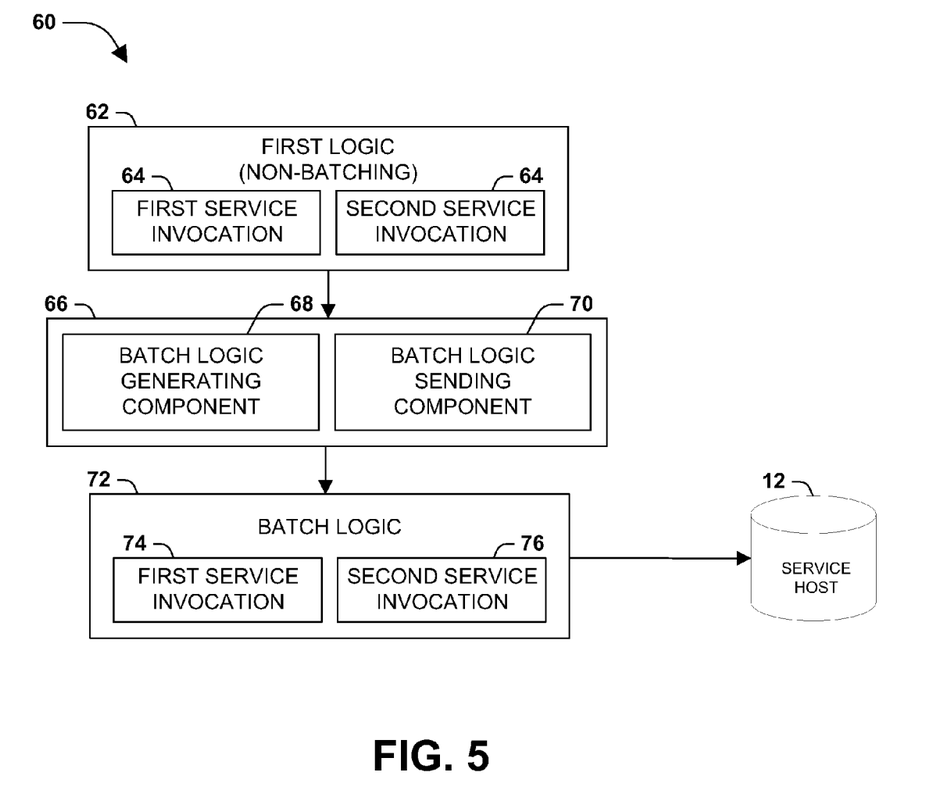
FIG. 5 is a component block diagram illustrating an exemplary system for invoking at least one service of a service host with at least two service invocations in a first logic specified in a language.

FIG. 5 illustrates a second embodiment of these techniques, comprising an exemplary system 66 for invoking at least one service of a service host 12 with at least two service invocations in a first logic specified in a language in a non-batching manner. The exemplary system 66 includes a batch logic generating component 68, which is configured to generate a batch logic 72 including the at least two service invocations 76 of the service. The exemplary system 66 also includes a batch logic sending component 70, which is configured to send the batch logic 72 to the service host 12. By translating the first logic 62 to the batch logic 72 and delivering the batch logic 72 to the service host 12, the exemplary system 66 thereby achieves the batch execution of the multiple service invocations 64 of the first logic 62, despite the non-batch nature of the first logic 62.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 4 and the exemplary system 66 of FIG. 5) to confer individual and/or synergistic advantages upon such embodiments.

A first aspect that may vary among embodiments relates to the types of service invocations to which these techniques may be applied. As a first example, the service invocations may be contained in many types of instruction sets, such as source code, partially or wholly compiled binaries, imperative scripts executed in an interpreter, and declarative data models that involve the invocation of the service (e.g., an HTML page specifying that part of a page is derived by executing various queries on a content database.) As a second example, these techniques may be applied to many types of invocations involving many types of services, such as a web service invoked by the invocation of remote methods in an application, or a database invoked by a series of queries. In an exemplary scenario, a source code may specify one or more language-integrated queries that are to be applied against one or more databases. For example, the expression tree may compile each service invocation into a lambda expression to be applied to the service. The expression tree, representing the batch logic, may then be sent to the service host for processing of the service invocations in a batched manner. Those of ordinary skill in the art may devise many types of services and service invocations to which the techniques discussed herein may be applied.

Figure 6:
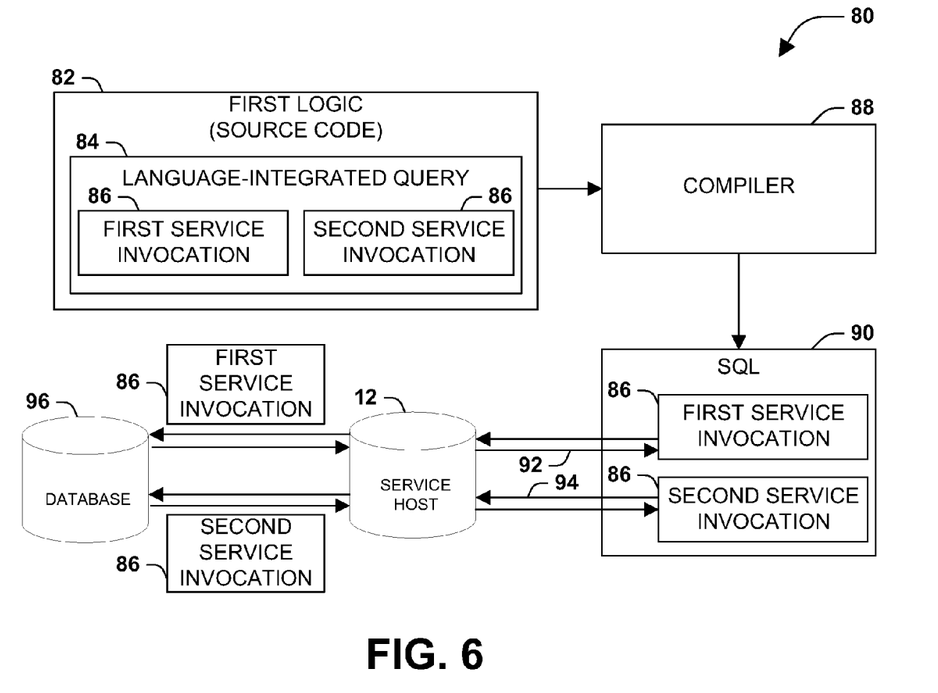
FIG. 6 is an illustration of an exemplary scenario involving two invocations of a service provided by a service host.
Figure 7:
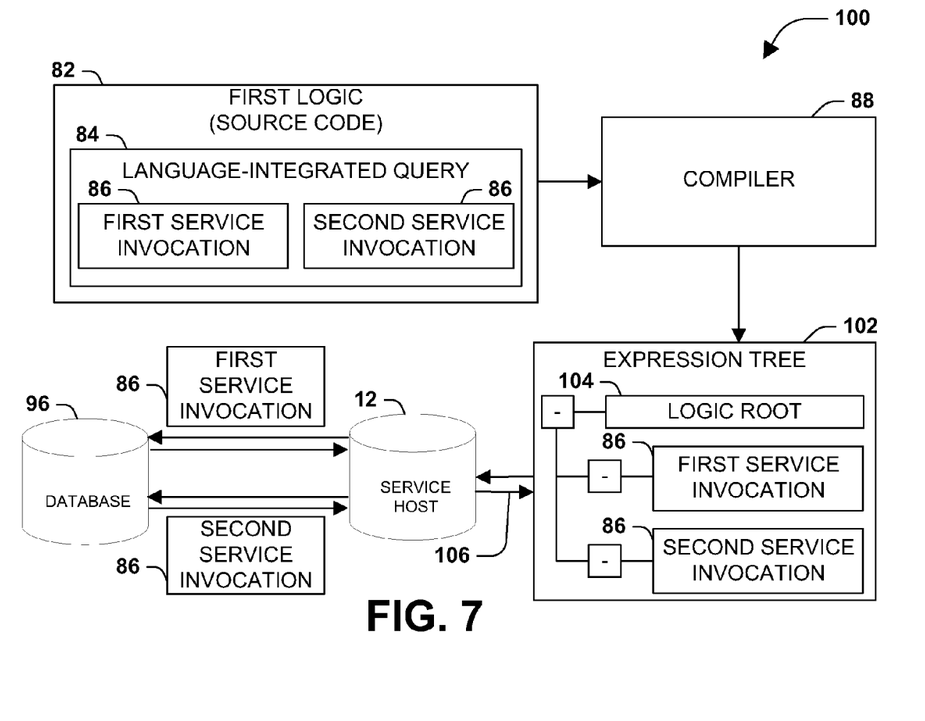
FIG. 7 is an illustration of another exemplary scenario involving two invocations of a service provided by a service host.

One such scenario is illustrated (contrastingly) in FIG. 6, illustrating an exemplary scenario 80 without batching, and FIG. 7, illustrating an exemplary scenario 100 with batching. In the exemplary scenario 80 of FIG. 6, a first logic 82 comprises a language-integrated query 84 having at least two service invocations 86 (e.g., two queries to be executed against a database 96.) In a scenario not involving the techniques illustrated herein, a compiler 88 may be utilized to compile the first logic 82 into a set of SQL statements 90 that are to be executed against the service host 12 (e.g., a front end for a database 96.) Because of the lack of batching, the first service invocation is processed by a first interaction 92, and the second service invocation is processed by a second interaction 94. By contrast, in the exemplary scenario 100 of FIG. 7, the compiler 88 may translate the language-integrated query 84 into an expression tree 102, which may represent a batching logic specifying the processing of both the first service invocation and the second service invocation. The expression tree 102 may then be sent to the service host 12 for execution, which may involve applying both service invocations against the database 96 and returning the result. Because the translation into the expression tree 102 results in batching of the service invocations 86, only a single interaction 106 is involved to send the service invocations to the service host 12 and to receive back a result set.

A second aspect that may vary among embodiments of these techniques relates to the manner of configuring the client to perform the invocations on the service host. As a first example, the client application may synchronously handle the batch of service invocations by delivering the batch logic to the service host, awaiting a response to the batch invocation by the service host, and continuing execution of the application. As a second example, the client application may asynchronously handle the batch of service invocations by delivering the batch logic to the service host, continuing execution of the application while the batch is being processed by the service host, and then receiving and handling the result set whenever the service invocations are complete. As a third example, the application may utilize a proxy to mediate communication with the service host. For example, a remote invocation API may be devised that accepts a batch of invocations (e.g., one or more language-integrated queries comprising two or more queries against one or more databases) and returns the results. Although it may not be visible to the client application, this remote invocation API might opaquely handle the querying through batching, e.g., by accepting the language-integrated query, translating it to an expression tree, sending the expression tree to the service host, receiving back a result set, and providing the result set to the client application. Moreover, the local proxy may be invokable in many ways. As one example, the local proxy may provide a querying interface configured to produce the batch logic and send it to the service host. As another example, the local proxy may asynchronously handle the interfacing with the service host by accepting an asynchronous callback from the client application along with the service invocations, and, upon receiving the result set, invoking the asynchronous callback to deliver the result set. By implementing the translating and sending in a local proxy, the computing environment may quietly impart a batching capability to the service invocations of various applications, despite the non-batching nature of the service invocations requested by the applications, resulting in a performance improvement without a re-coding of the service invocations in a batching language. Those of ordinary skill in the art may devise many configurations of a local proxy that implement the techniques discussed herein.

A third aspect that may vary among embodiments of these techniques relates to the exchange of data between the client and the service host, such as the parameters sent by the client to be used in the service invocation, and a result or result set returned from the service host to the client in response to the invocations of the service. As a first example, one or more service invocations may involve a local object to be used in the service invocation, and while generating the batch logic, the local object may be represented in the batch logic (e.g., by translating the object into an object format compatible with the batch-capable language.) Alternatively or additionally, the translating may serialize the local object for transmission to the service host. As a second example, the invocation of the services may result in data to be returned to the client application, such as an invocation result ("success," "failure," etc.) or a result set. A service invocation result that is received in response to the batch logic may be returned to the client application; e.g., a local proxy may deserialize the objects of the result set and return them to the client application to complete the synchronously or asynchronously processed batch of service invocations. In one such scenario, respective local objects may correspond to records in the service invocation result, such that one object may be deserialized for each record in the returned result set. Moreover, a querying interface may be generated and provided to the local objects to facilitate the application in querying the data contained in the deserialized objects. In another scenario, the data of the returned result set may be data-bound to various properties of an existing object, and when the result set is received by the client, the received data may be copied into respective bound properties of the objects. These and other features may be combined with the translating of the batch logic and the sending to the service host to facilitate the integration of the service invocations with the other aspects of the application. Those of ordinary skill in the art may devise many ways of handling the exchange of data between the client application and the service host while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
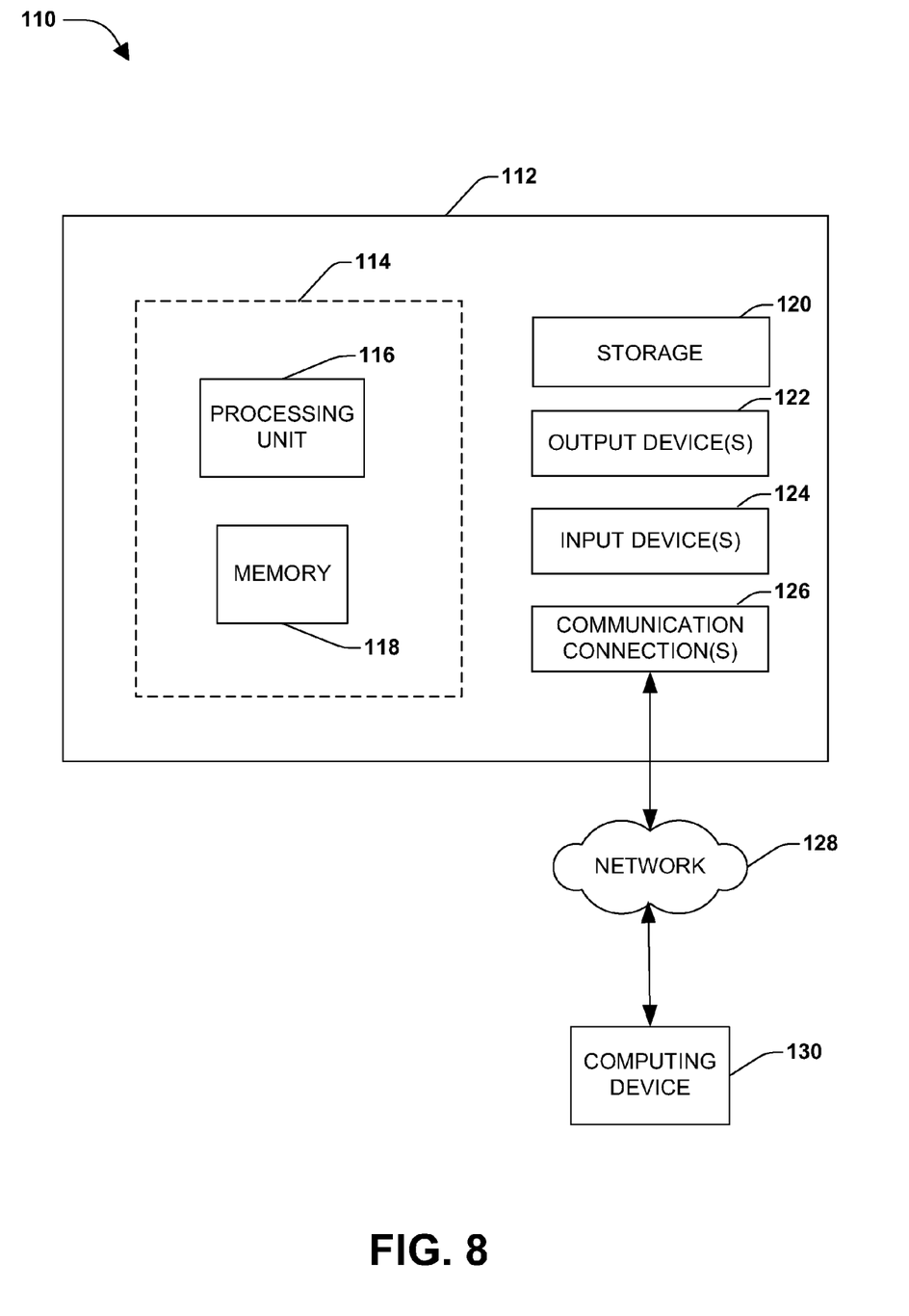
FIG. 8 is an illustration of an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 8 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 8 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-implemented method of invoking services of a service host the method comprising:

upon receiving a first logic comprising a language integrated query and at least two service invocations specified in a first language that does not support a batching of service invocations:

translating respective service invocations in the first language into translated service invocations specified in a second language that supports the batching of service invocations and translating the language integrated query into an expression tree specified in the second language, wherein the expression tree comprises at least one lambda expression generated from the first logic;

generating a batch logic specified in the second language and comprising the at least two service invocations of the service; and sending the batch logic to the service host.

2. The method of claim 1:

the first logic referencing at least one local object, and the translating comprising: representing the at least one local object in the batch logic.

3. The method of claim 1, the sending comprising: sending the batch logic to a local proxy configured to send the batch logic to the service host.

4. The method of claim 3:

the local proxy providing a querying interface configured to produce the batch logic specified in the second language, and the generating comprising: invoking the querying interface of the local proxy with the translated service invocations.

5. The method of claim 3, the sending comprising: sending an asynchronous callback with the batch logic to the local proxy.

6. The method of claim 1, comprising: receiving a service invocation result from the service host in response to the batch logic.

7. The method of claim 6, the receiving comprising: generating at least one local object of the first language comprising at least one element of the service invocation result.

8. The method of claim 7, respective local objects corresponding to a record in the service invocation result.

9. The method of claim 7, the at least one local object comprising a querying interface configured to access properties of the local object.

10. The method of claim 6, the receiving comprising: storing at least one element of the service invocation result in at least one local object of the first language.

11. A computer-readable storage medium comprising instructions that, when executed on a processor of a device, cause the device to invoke services of a service host by:

upon receiving a first logic comprising a language integrated query and at least two service invocations specified in a first language that does not support a batching of service invocations:

translating respective service invocations in the first language into translated service invocations specified in a second language that supports the batching of service invocations and translating the language integrated query into an expression tree specified in the second language,
  wherein the expression tree comprises at least one lambda expression generated from the first logic;
generating a batch logic specified in the second language and comprising the at least two service invocations of the service; and
sending the batch logic to the service host.

12. The computer-readable storage medium of claim 11, comprising: receiving a service invocation result from the service host in response to the batch logic.

13. The computer-readable storage medium of claim 11, the receiving comprising: receiving a service invocation result from the service host before returning from the sending.

14. The computer-readable storage medium of claim 13:
  the generating comprising: receiving an asynchronous callback with the first logic;
  the sending comprising: returning from the sending upon sending the logic to the service host; and
  the receiving comprising: invoking the asynchronous callback upon receiving a service invocation result from the service host in response to the batch logic.

* * * * *